United States Patent [19]

Tamada et al.

[11] Patent Number: 5,022,729
[45] Date of Patent: Jun. 11, 1991

[54] OPTICAL WAVEGUIDE AND SECOND HARMONIC GENERATOR

[75] Inventors: Hitoshi Tamada; Masaki Saitoh, both of Kanagawa, Japan

[73] Assignee: Sony Corporation, Tokyo, Japan

[21] Appl. No.: 424,768

[22] Filed: Oct. 20, 1989

[30] Foreign Application Priority Data

| Oct. 21, 1988 | [JP] | Japan | 63-265785 |
| Oct. 21, 1988 | [JP] | Japan | 63-265786 |
| Oct. 21, 1988 | [JP] | Japan | 63-265787 |
| Jun. 2, 1989 | [JP] | Japan | 1-141946 |

[51] Int. Cl.⁵ ............................................. G02B 6/12
[52] U.S. Cl. ............................ 350/96.12; 350/96.14; 307/427
[58] Field of Search ................ 350/96.12, 96.14; 307/425–430

[56] References Cited

U.S. PATENT DOCUMENTS

| 3,935,472 | 1/1976 | Bethea et al. | 350/96.12 X |
| 4,763,019 | 8/1988 | Duguay et al. | 307/427 |
| 4,859,876 | 8/1989 | Dirk et al. | 350/96.14 X |

OTHER PUBLICATIONS

Applied Physics Letters, "Phase-Matched Second-Harmonic Generation in Solid Thin Films Using Modulation of the Nonlinear Susceptibilities", vol. 28, No. 11, Jun. 1, 1976, pp. 651-653.
IBM Technical Disclosure Bulletin, "Second Harmonic Generator with Semiconductor Lasers", vol. 24, No. 1B, Jun. 1981, pp. 681-682.
Applied Physics Letters, "Optical Second Harmonic Generator in Form of Coherent Cerenkov Radiation from a Thin–Film Waveguide", vol. 17, No. 10, Nov. 15, 1970, pp. 447-450.

Primary Examiner—John D. Lee
Assistant Examiner—Phan T. Heartney
Attorney, Agent, or Firm—Hill, Van Santen, Steadman & Simpson

[57] ABSTRACT

An optical waveguide apparatus arranged such that a $Ta_2O_5$-$TiO_2$ system amorphous thin film is formed on a substrate. This optical waveguide apparatus can perform optical waveguiding at high efficiency. Also, an optical waveguide-type second harmonic generator of Cerenkov radiation type arranged such that the amorphous thin film is formed on a non-linear optical crystal substrate. This optical waveguide-type second harmonic generator can efficiently perform the confinement of light, whereby a fundamental wave of near-infrared rays can be received and a second harmonic wave radiated to the substrate side can be obtained with high efficiency. Further, in a second harmonic generator (SHG) in which the amorphous optical waveguide is formed on an $LiNbO_3$ non-linear optical crystal substrate on which surface is formed a periodically-poled region, this second harmonic generator can very efficiently generate a light having a wavelength of half of a semiconductor laser light of 0.8 micrometer band by selecting a relationship between a periodically-poled region cycle $\Lambda$ and a thickness $h$ of an optical waveguide.

7 Claims, 10 Drawing Sheets

FIG. 1
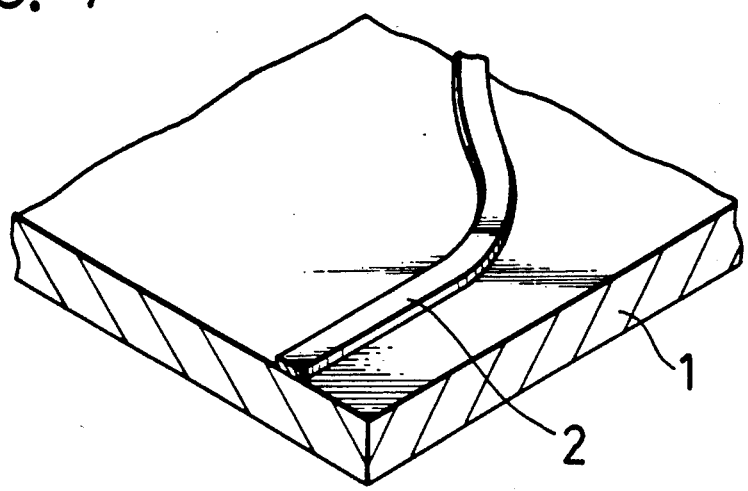
FIG. 2A
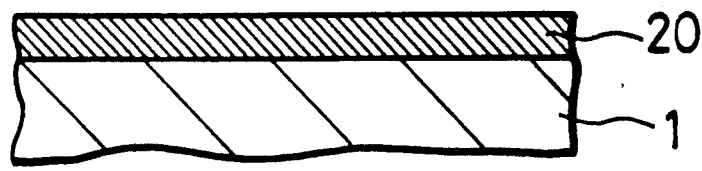
FIG. 2B₁
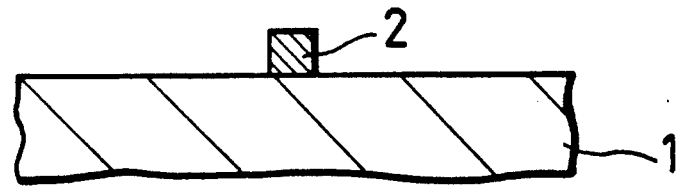
FIG. 2B₂
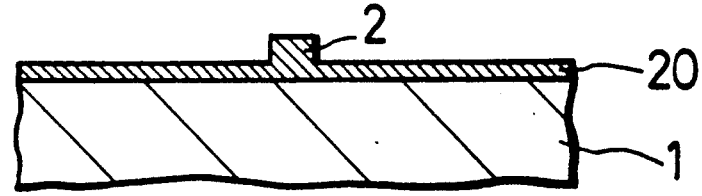
FIG. 2B₃
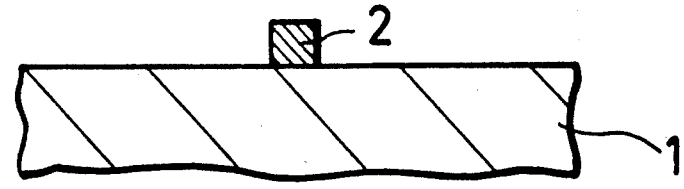
FIG. 2C₃
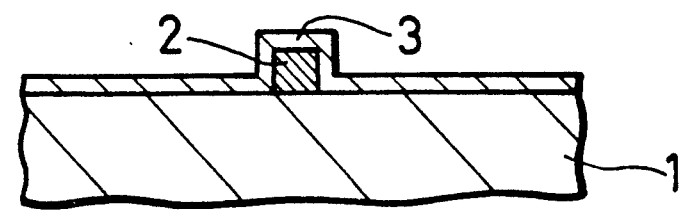

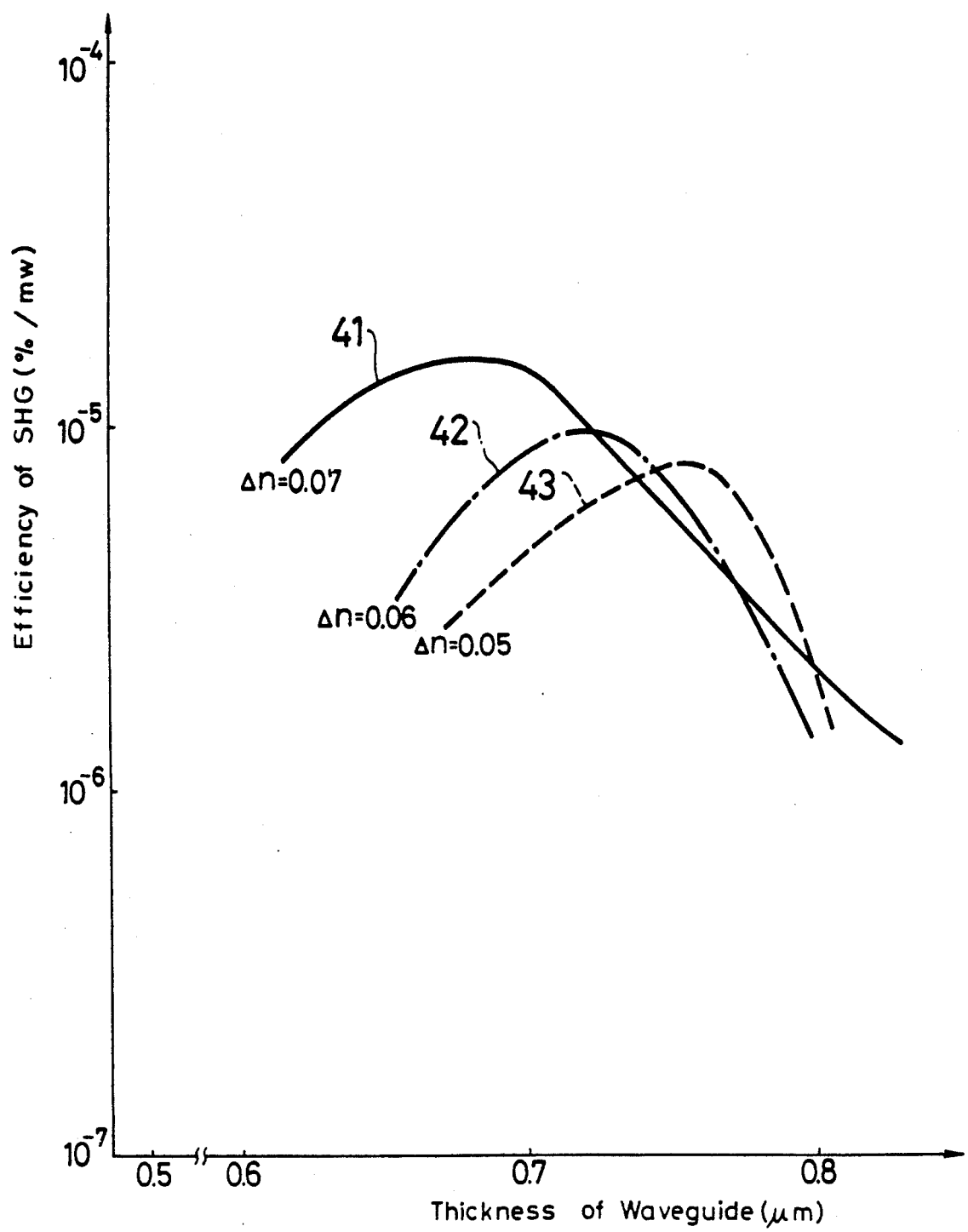

F I G. 12
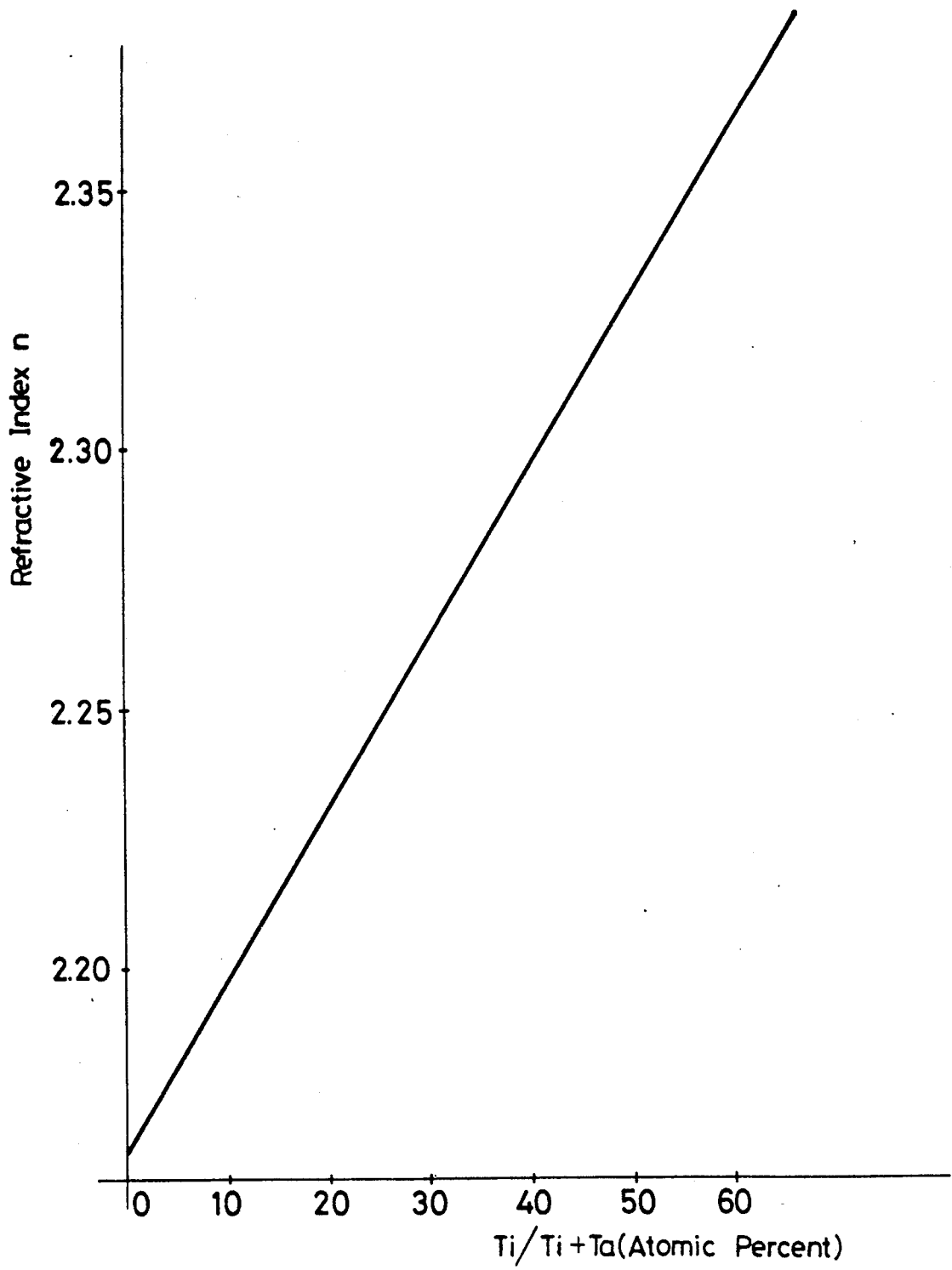

OPTICAL WAVEGUIDE AND SECOND HARMONIC GENERATOR

BACKGROUND OF THE INVENTION

1. Field of the Invention

The present invention relates generally to optical waveguide apparatus for use with an optical communication, an optical integrated circuit and the like and, more particularly, is directed to a second harmonic generator of optical waveguide type based on Cerenkov radiation.

2. Description of the Prior Art

An optical waveguide in an optical communication, an optical integrated circuit and the like must be made of optical waveguide material having a refractive index as high as possible so that it can fully confine a waveguide light.

As a low loss waveguide, an amorphous film such as $Ta_2O_5$ and $Nb_2O_5$, a single crystal film of PLZT (Pb-based Lanthanum-doped Zirconate Titanates) and chalcogenide such as $As_2S_5$ are provided to make an optical waveguide of high refractive index. The refractive indices of the above-noted constituents are: $Ta_2O_5$ has a refractive index of 1.9 to 2.2; $Nb_2O_5$ has a refractive index of 2.1 to 2.3; PLZT has a refractive index of about 2.6; and chalcogenide has a refractive index higher than 2.3. However, there are presented the following problems: the PLZT has to be grown as a single crystal film so that as a substrate for this film growing-process, there is used only a single crystal substrate such as sapphire and the like; chalcogenide-based material has high light absorption property in the area of visible light so that it can not make an optical waveguide which is used in the area of visible light; and $Ta_2O_5$ has a small refractive index compared with those of $LiNbO_3$ substrate and $LiTaO_3$ substrate which are frequently used in the optical IC so that it can not make an optical waveguide for such substrate.

In this manner, a thin film optical waveguide can not be formed on a substrate such as $LiNbO_3$ and $LiTaO_3$ so as to achieve low propagation loss ($<1dB/cm$) over a wide range from a near-infrared ray area to a visible light area.

A second harmonic generator is known, which generates, when supplied with a light having a frequency $\omega$, a second harmonic wave light of frequency $2\omega$. According to the second harmonic generator, the wavelength region can be enlarged and, with the enlarged wavelength region, a laser apparatus are utilized in a wider variety of applications, and the use of laser light can be optimized in various technical fields. For example, in the optical recording and reproducing process and magneto-optical recording and reproducing process by use of laser light, it becomes possible to increase recording density by reducing the wavelength of laser beam.

Journal of Applied Physics Letters 17, 447 (1970) reported a second harmonic generator of Cerenkov radiation type in which a linear optical waveguide is formed on a non-linear single crystal substrate, and which is supplied with a fundamental wave to achieve a second harmonic wave radiation mode to generate a secondary harmonic wave from the substrate side. This type of second harmonic generator comprises a ZnO non-linear single crystal substrate and a ZnS polycrystal optical waveguide formed thereon and generates a second harmonic wave of 0.53 micrometer by use of a Nd:YAG laser having a wavelength of 1.06 micrometers. In this second harmonic generator, the waveguide thereof is made of polycrystalline material so that its propagation loss is large and a d constant of the ZnO substrate is small, which provides a considerably degenerated efficiency.

Japanese Laid-Open Patent Gazette No. 61-189524 discloses a second harmonic generator. This previously-proposed second harmonic generator employs a LiNbO₃ (hereinafter, simply referred to as LN) substrate which has an optical waveguide constitution by exchanging its proton. In this case, it is to be noted that a semiconductor laser of 0.84 micrometer is utilized as a fundamental light source, and which is supplied with an input of about 100 mW for generating an SHG light of 1 to 2 mW. The most specific feature of the SHG element of this system lies in an automatic phase matching process. In these SHG elements, however, SHG efficiency is less than 1 to 2% relative to the input of 100 mW, and cannot achieve SHG efficiency of, for example, 10% which is required in practice. Further, the proton exchange-process is effective only for the LN substrate, and cannot be applied to other substrates such as $LiTaO_3$ and $KNbO_3$.

In the case of the Cerenkov radiation-type second harmonic generator, the efficiency $\eta$ has a relationship for a d constant of non-linear optical material, fundamental wave power density $P^\omega$ and mutual action length l $$\eta \alpha d^2 \cdot P^\omega \cdot l$$

Accordingly, in order to gain a high efficiency of second harmonic generator, a material having a large d constant must be used, the fundamental wave power density $P^\omega$ must be increased and the mutual action length l must be increased. The value of d constant is changed depending on the geometrical relation of its crystal azimuth and polarized wave direction of fundamental wave even in the same material. In the case of LN, the value of d constant is varied as $$d_{31} = -5.9 \times 10^{-12} \text{ (m/V)}$$

$$d_{22} = 4.0 \times 10^{-12} \text{ (m/V)}$$

$$d_{33} = -34.4 \times 10^{-12} \text{ (m/V)}$$

Thus, $|d_{33}|$ is largest. In the proton exchange-process, only a refractive index n for an extraordinary ray can be increased. Further, in the proton exchange-process, an X plate and a Y plate are etched during the proton exchange-process and the surfaces thereof are made coarse, whereby the LN as the non-linear single crystal substrate can utilize only the Z plate (substrate having a plane perpendicular to z-axis extended along c-axis) and utilize only the TM wave mode. Thus, when the semiconductor laser is employed as the light source, a ½ wavelength plate must be provided between the semiconductor laser and the input end of the optical waveguide of the second harmonic generator so as to rotate the polarized wave direction of the laser light by 90 degrees. This requires a collimator lens for introducing a laser light into the ½ wavelength plate as a collimated light and an objective lens for converging the light, traveled through the ½ wavelength plate, on the optical waveguide of the second harmonic generator, which provides a complicated and large-sized optical system.

Further, a refractive index difference Δn between the waveguide and the substrate is about 0.14 at maximum. There is then a limit on the confinement of light, i.e. the maximum efficiency. In addition, the proton exchange-process is effective only for the LN and can not be applied to $LiTaO_3$, $KNbO_3$ or the like.

Furthermore, in order to increase the SHG efficiency, it becomes important to improve an overlap between the fundamental guide mode and the secondary radiation mode. When the single-poled $LiNbO_3$ substrate is employed, there is then a limit to improving the overlap between the fundamental guide mode and the secondary radiation mode. Thus, the SHG efficiency can not be improved satisfactorily.

As shown in FIG. 16, the radiated SHG wave has a lateral spread angle of larger than 10 degrees and has a beam spot S of a crescent-shape. There is then presented a problem of a converging characteristic.

OBJECTS AND SUMMARY OF THE INVENTION

Accordingly, it is an object of the present invention to provide an improved optical waveguide and second harmonic generator which can eliminate the defects encountered with the prior art.

More specifically, it is another object of the present invention to provide an optical waveguide apparatus in which a $Ta_2O_5$-$TiO_2$ system amorphous thin film is formed on a substrate, and which can perform optical waveguide at high efficiency.

It is another object of the present invention to provide a second harmonic generator of Cerenkov radiation type in which a $Ta_2O_5$-$TiO_2$ system amorphous thin film is formed on a non-linear optical crystal substrate, and in which a confinement of a light is performed efficiently so that, when a fundamental wave of near-infrared rays is introduced, a second harmonic wave radiated at the substrate side can be obtained at high efficiency.

It is still another object of the present invention to provide a second harmonic generator in which a fundamental waveguide formed of $TiO_2$-doped-$Ta_2O_5$ thin film is formed on an $LiNbO_3$ non-linear optical crystal substrate in which a periodically-poled region is formed on the surface, and in which an overlap between the fundamental guide mode and the second harmonic radiation mode can be improved by specifying a mutual relationship between a thickness h (micrometer) of the waveguide and a periodically-poled region cycle Λ (micrometer).

It is still another object of the present invention to provide a second harmonic generator which can enhance a second harmonic generation efficiency by more than 10% and which can obtain an SHG light beam of excellent converging characteristic in which a diverging angle of SHG light beam is small.

It is a further object of the present invention to provide a second harmonic generator in which the optical waveguide has its incident end face side of a fundamental wave tapered to be gradually wide toward its end portion and a semiconductor laser is optically coupled to the wide end portion of the optical waveguide.

According to an aspect of the present invention, there is provided an optical waveguide and second harmonic generator comprising:

a substrate; and an optical waveguide formed on said substrate, wherein said optical waveguide is a $Ta_2O_5$-$TiO_2$-system amorphous thin film in which an amount of Ti relative to a sum of Ti and Ta is selected in a range from 0 to 60 atomic percents.

These and other objects, features and advantages of the present invention will be apparent in the following detailed description of preferred embodiments when read in conjunction with the accompanying drawings, in which like reference numerals are used to identify the same or similar parts in the several views.

BRIEF DESCRIPTION OF THE DRAWINGS

FIG. 1 is a schematic perspective view showing a portion of an embodiment of the optical waveguide and second harmonic generator according to the present invention;

FIGS. 2A to $2C_3$ are process diagrams to which reference will be made in explaining the manufacturing-process of the optical waveguide and second harmonic generator according to the present invention, respectively;

FIG. 5 is a graph showing measured results of the relationship between the second harmonic generator efficiency and the thickness of waveguide of $TiO_2$-doped-$Ta_2O_5$ film;

FIG. 12 is a schematic representation to which reference will be made in explaining a relationship between a refractive index of an optical waveguide and a Ti-doped amount;

DETAILED DESCRIPTION OF PREFERRED EMBODIMENTS

The present invention will now be described in detail with reference to the drawings.

According to an embodiment of the optical waveguide and second harmonic generator of the present invention, as shown in FIG. 1, an amorphous optical waveguide 2 was formed on a substrate 1. The amorphous optical waveguide 2 was formed such that $TiO_2$ was doped to $Ta_2O_5$ by a doping amount in which Ti was in a range of from 0 to 60 atomic percents relative to the sum of Ti and Ta. The optical waveguide and second harmonic generator thus made present sufficient low propagation loss and large refractive index over a range from near-infra-red rays to a visible light region. For example, the refractive index n in the wavelength region of 0.6328 micrometer could be varied in a range of about 2.2 to 2.4 by selecting a doping amount of Ti.

Figure 4:
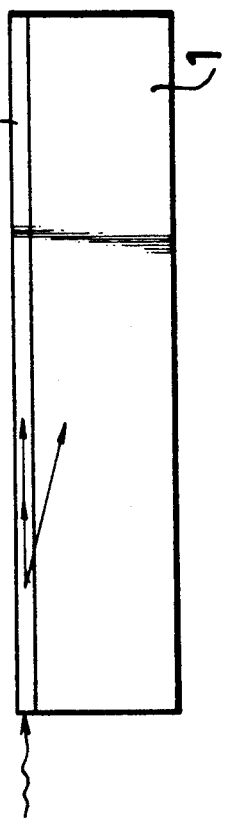
FIG. 4 is a schematic side view of another embodiment of the second harmonic generator according to the present invention.

Further, in a second harmonic generator based on Cerenkov radiation in which an optical waveguide 2 was formed on a substrate 1 made of a non-linear material as shown in FIG. 4, the optical waveguide 2 was formed of an optical waveguide in which $TiO_2$ was doped to $Ta_2O_5$ so that, even when LN, for example, was utilized as the non-linear optical material substrate 1, a refractive index difference $\Delta n$ between the optical waveguide 2 and the substrate 1 could be increased sufficiently and that the maximum efficiency could be increased.

Furthermore, if not only the Z plate of the LN substrate but also the X plate or Y plate perpendicular to the Z plate was employed, it would be possible to construct the low loss waveguide. Thus, the employment of $d_{33}$ made the TM wave mode and the TE wave mode possible. Accordingly, if the TE wave mode was made and the semiconductor laser was used as a fundamental wave light source, a ½ wavelength plate, which was needed to couple the second harmonic generator in the TM wave mode could be removed.

Further, since the substrate 1 was not limited to the LN substrate and might be made of a transparent substrate material having a heat-resisting property for a substrate temperature produced when the optical waveguide was deposited on the substrate by, for example, a chemical vapor deposition (CVD) process, freedom for selecting substrate material can be increased, and a material having a smaller refractive index can be used, which provides a more increased refractive index difference $\Delta n$. Thus, the confinement of light can be effectively performed and sufficiently high maximum efficiency can be achieved.

Furthermore, the optical waveguide is an amorphous waveguide so that the propagation loss, increased by the existence of crystalline grain boundary, can be avoided. Thus, a second harmonic generator of high efficiency can be obtained and the optical waveguide can be easily formed as a ridge-type optical waveguide by a some suitable manufacturing-process.

Figure 11:
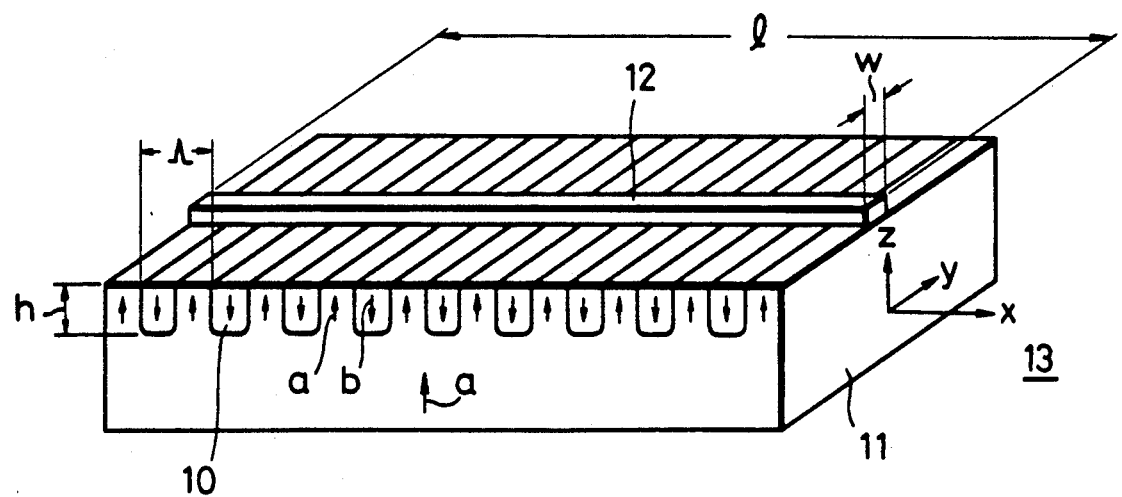
FIG. 11 is a schematic perspective view illustrating a further embodiment of the second harmonic generator according to the present invention.

As shown in FIG. 11, a fundamental waveguide 12 of $TiO_2$-doped-$Ta_2O_5$ thin film is formed on an $LiNbO_3$ non-linear optical crystal substrate 11 in which a periodically-poled region 10 is formed on the surface. Thus, an overlap between the fundamental guide mode and the second harmonic radiation mode is arranged to present features different from those of the single-poled substrate.

Figure 10:
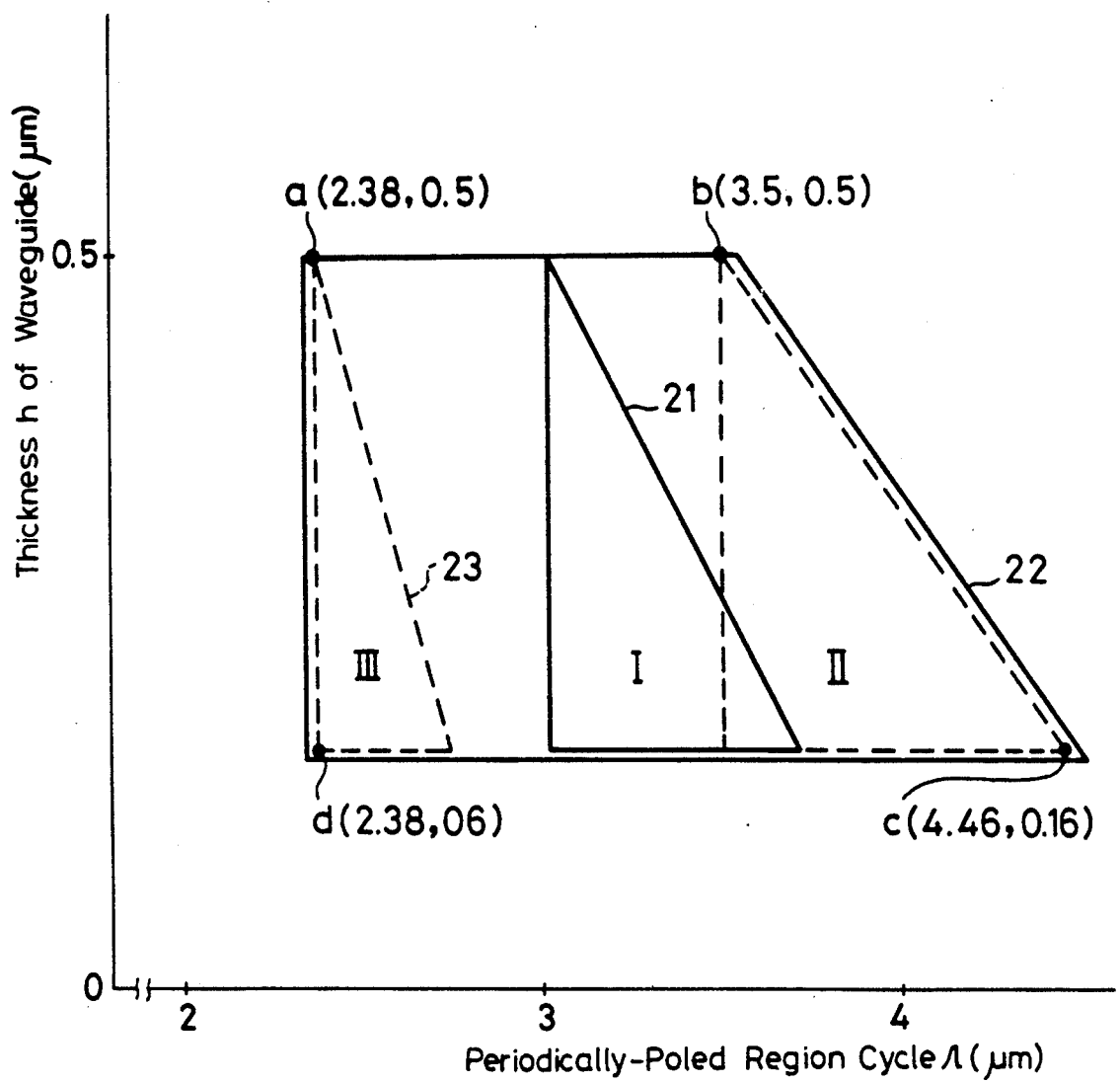
FIG. 10 is a schematic representation to which reference will be made in explaining a range in which a thickness of an optical waveguide and a periodically-poled region cycle of the embodiment shown in FIG. 9 are measured.

A periodically-poled region cycle $\Lambda$ of the periodically-poled region 10 is selected so as to satisfy Cerenkov radiation condition $$\Lambda \approx \frac{n_{ezx} \cdot k_p - 2\beta_{gm}}{2\pi}$$

where $n_{ezs}$ represents the refractive index of substrate in the wavelength of SHG light beam, $k_p$ the wave number of the SHG light beam, and $\beta_{gm}$ the propagation constant of the fundamental wave. In particular, according to the present invention, as shown in FIG. 10, a relationship between the periodically-poled region cycle $\Lambda$ of the periodically-poled region 10 and the thickness h of the fundamental waveguide 12 is arranged to fall within a range which is formed by sequentially connecting by a straight line a point a (2.38, 0.5), a point b (3.5, 0.5), a point c (4.46, 0.16) and a point d (2.38, 0.16) and the point a in (x, y) coordinates in the orthogonal coordinate system in which the periodically-poled region cycle $\Lambda$ (micrometer) is presented on the x-axis and the thickness h (micrometer) is presented on the y-axis. As is clear from FIG. 10, the second harmonic generator according to the present invention can demonstrate the SHG efficiency of higher than 10% or SHG efficiency of 30% for the semiconductor laser light of 0.8 micrometer band.

Figure 16:
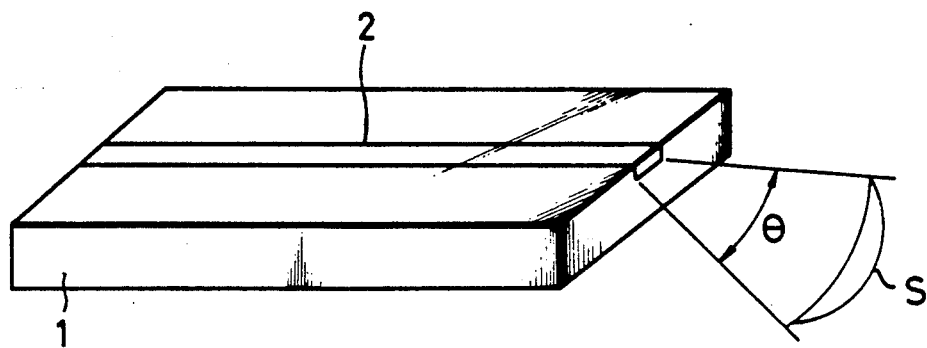
FIG. 16 is a schematic perspective view illustrating a second harmonic generator according to the prior art.

Further, according to the present invention, the overlap between the fundamental guide mode and the second harmonic radiation mode is produced near the interface between the substrate 11 and the optical waveguide 12 and the so-called Cerenkov angle can be reduced, whereby the thickness of the substrate 11 can be reduced, the second harmonic generator can be made small, and the radiation angle of the SHG light beam can be reduced. Therefore, the angle $\theta$ in which the SHG wave is spread in the lateral direction as described in respect to FIG. 16 can be reduced. Thus, the converging characteristic can be improved. In other words, upon use, the optical system of the second harmonic generator can be simplified in practice.

EXAMPLE 1

As shown in FIG. 2A, a thin film 20 in which $TiO_2$ was doped to $Ta_2O_5$ was formed on the substrate 1, for example, $LiNbO_3$ substrate by a chemical vapor deposition (CVD) process. According to the CVD process, tantalum-pentaethoxide, $Ta(OC_2H_5)_5$ and titanium-tetrapropoxide, $Ti(O\text{-}i\text{-}C_3H_7)_4$ were employed as raw material gas and the thin film 20 was formed on the substrate 1 as an amorphous film under a substrate temperature of 600° C.

An etching-resist (not shown) made by, for example, a photoresist, was deposited on the thin film 20 in a pattern of a target optical waveguide according to a known-process. While the above-noted photoresist was employed as a mask, the amorphous thin film 20 was etched by, for example, a reactive ion etching (RIE)-process to form an optical waveguide 2 as shown in FIG. 2B$_1$. In this case, although the thin film 20 can be removed over its entire thickness except the optical waveguide 2 by the etching-process, the thickness of the portion of the thin film 20 except the optical waveguide 2 may be left as shown in FIG. 2B$_2$ in order to reduce the propagation loss. Alternatively, after the etching-process similar to that described in connection with FIG. 2B$_1$ is carried out as shown in FIG. 2B$_3$, a protecting film 3 made of, for example, SiO$_2$, Ta$_2$O$_5$ or the like may be formed thereon as shown in FIG. 2C$_3$.

Figure 3:
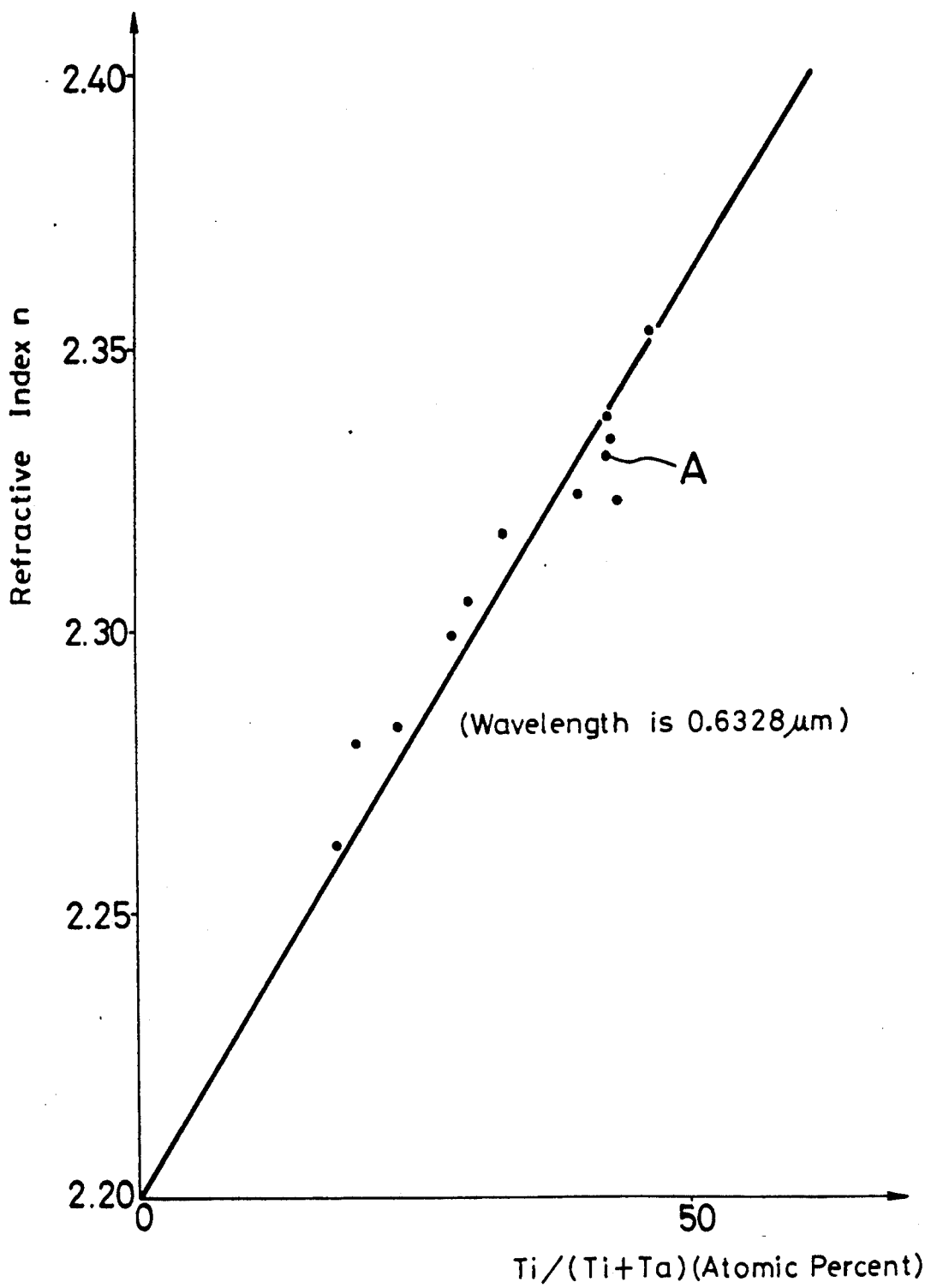
FIG. 3 is a graph showing measured results of the relationship between the refractive index and the Ti/(Ti+Ta) doping amount (atomic percent) of an optical waveguide film.

FIG. 3 shows measured results of the refractive index n of the Ti-doped amorphous thin film 20 on the substrate 1 relative to the wavelength 0.6328 micrometer by changing the doped amount of Ti. In FIG. 3, the abscissa represents Ti ratio relative to sum of Ti and Ta, i.e. Ti/(Ti+Ta) (atomic percent), and the ordinate represents refractive index n. From FIG. 3, it will be clear that the refractive index n increases in proportion to the amount of Ti, wherein when Ti/(Ti+Ta)≃46 (atomic percents), n becomes 2.35. In that event, checking the propagation of waveguide light with respect to a sample shown by, for example, a point A of FIG. 3, it was confirmed that the light was guided over the length of 15 mm, the sample end face was lit and that the propagation loss can be sufficiently reduced. When Ti/(Ti+Ta)>60 (atomic percents), however, crystallization occurred, and the propagation loss was rapidly increased. In other words, in a range of from 0<Ti/(Ti+Ta)≲60 (atomic percents) or, more preferably, in a range of 15 <Ti/(Ti+Ta)<60 (atomic percents), an excellent amorphous film can be formed and its refractive index n can be selected in a range of 2.2 to 2.4.

While in the above-noted example the amorphous film 20, i.e. the optical waveguide 2 is formed under the substrate temperature of 600° C., if the substrate temperature is lowered by the application of a photo CVD, the doped amount of Ti in the amorphous film can be increased more, which provides a larger refractive index n.

The refractive index n and the propagation loss of the sample at the point A relative to the wavelength of 0.4765 micrometer were measured. In this case, the refractive index n becomes 2.425 and the propagation loss is the same as that measured when the wavelength is 0.6328 micrometer.

As described above, in the above embodiment of the optical waveguide and second harmonic generator according to the present invention, the amorphous optical waveguide is formed by adding TiO$_2$ to Ta$_2$O$_5$ with the doping amount of 0<Ti/(Ti+Ta)≲60 (atomic percents), whereby the large refractive index n can be provided in a range from the near-infra-red rays to the entire region of visible light, and the propagation loss can be reduced. Thus, it is possible to construct an optical waveguide having high efficiency.

Further, since the optical waveguide is formed of the amorphous film, the substrate 1 is not limited to a single crystal substrate and so on. Accordingly, the material for the substrate 1 can be selected with large freedom and therefore a material having a low refractive index can be selected as the material for the substrate 1. Thus, a difference between refractive indexes of the substrate and the optical waveguide can be sufficiently increased, thus making it possible to efficiently perform the confinement of light in the optical waveguide.

Furthermore, since the optical waveguide is formed of the amorphous film, the optical waveguide can be produced with ease, which leads to the realization of fine-manufacturing-processing of an IC or the like. Thus, a lot of advantage can be brought about in practice.

EXAMPLE 2

As shown in FIG. 4, the optical waveguide 2, made by the amorphous thin film 20 in which TiO$_2$ was doped into Ta$_2$O$_5$, was grown on the LN substrate 1 by the CVD-process. The thin film 20, i.e. the optical waveguide 2 was grown on the substrate 1 as the amorphous film by at the substrate temperature of 600° C. by use of the CVD-process in which tantalum-pentaethoxide, Ta(OC$_2$H$_5$)$_5$ and titanium-tetraisopropoxide Ti(O-i-C$_3$H$_7$) were employed as raw material gas. In that manner, a so-called slab waveguide-type second harmonic generator was made.

Figure 6:
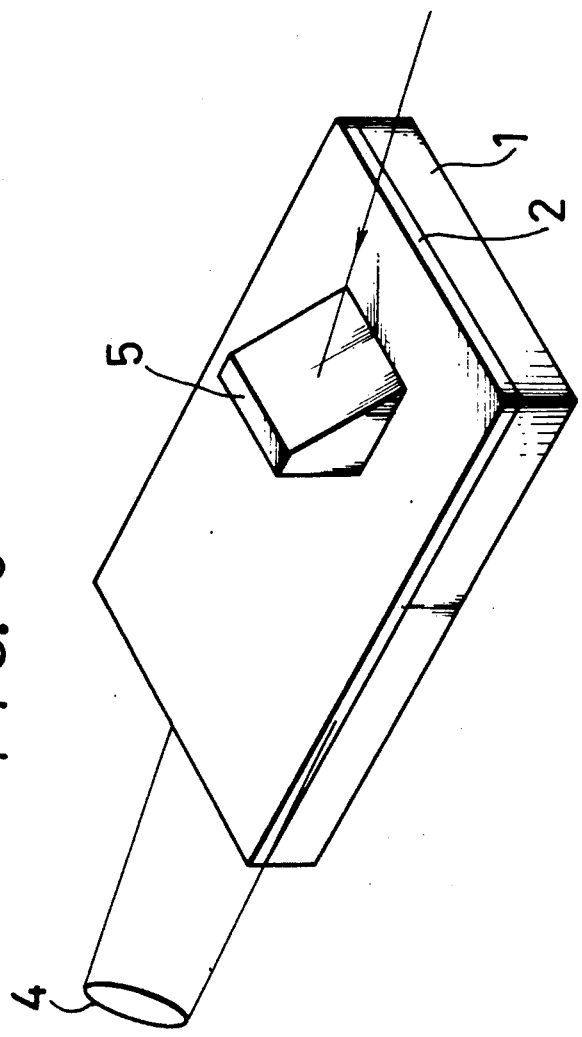
FIG. 6 is a schematic perspective view of the optical waveguide and second harmonic generator, and to which reference will be made in explaining how to measure second harmonic generator efficiency relative to the thickness of waveguide.
Figure 9:
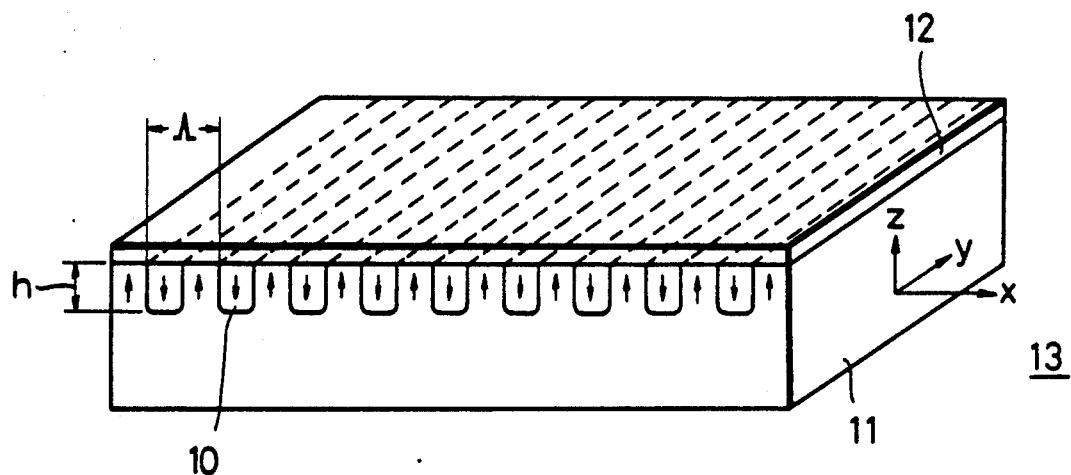
FIG. 9 is a schematic perspective view illustrating another embodiment of the second harmonic generator according to the present invention in an enlarged scale.

In that event, under the condition that the thickness of waveguide was changed and an Nd:YAG laser having a wavelength of 1.06 micrometers was employed as a fundamental light source, the efficiency of second harmonic light generated was enumerated. FIG. 5 shows measured results thereof. In FIG. 5, curves 41, 42 and 43 show measured results of second harmonic generation efficiency relative to the thickness of waveguide where $\Delta n = 0.07$, $\Delta n = 0.06$ and $\Delta n = 0.05$ are established by the selection of Ti doped amount, respectively. The second harmonic generator efficiency was measured by the following manner. As shown in FIG. 6, a GaP prism 5 was located on the optical waveguide 2, wherein a laser light of wavelength, 1.06 micrometers from the Nd:YAG laser was introduced into the Gap prism 5 and an SHG (second harmonic generation) light 4 emitted from the output end face of the optical waveguide 2 was measured. FIG. 3 shows measured results of refractive index of waveguide made by the TiO$_2$-doped film versus the Ti-doped amount relative to wavelength of 0.6328 micrometer. It will be clear from FIG. 3 that the refractive index n is increased in proportion to the doped amount of Ti. When Ti/(Ti+Ta)≃46 (atomic percents), $\Delta n = 0.15$. In that event, when Ti/(Ti+Ta)≳60 (atomic percents), crystallization was observed. Accordingly, the doped amount of Ti lies in a range of 0<Ti/(Ti+Ta)≦60 (atomic percents), and more preferably, it lies in a range of 15<Ti/(Ti+Ta)≦60 (atomic percents).

EXAMPLE 3

With the employment of a Y plate made of LN, the optical waveguide 2 made of a TiO$_2$-doped-Ta$_2$O$_5$ film was formed. In that case, Cerenkov radiation of TE wave mode was observed.

EXAMPLE 4

With the employment of X plate made of LN, the optical waveguide 2 made of a TiO$_2$-doped-Ta$_2$O$_5$ film was formed. In that case, Cerenkov radiation of TE wave mode was observed.

While in the above-noted examples 2 to 4 the optical waveguide of the invention is formed as a slab-type optical waveguide, it is possible to form a ridge-type optical waveguide.

EXAMPLE 5

Figure 7:
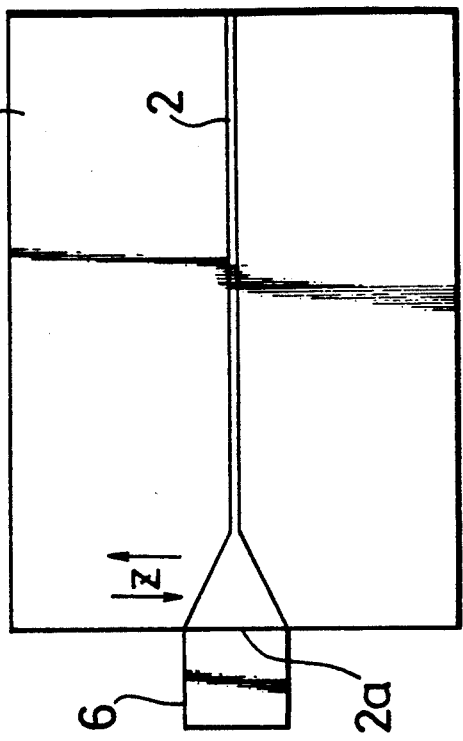
FIG. 7 is a planar view illustrating a third embodiment of the optical waveguide and second harmonic generator according to the present invention in an enlarged scale.
Figure 8:
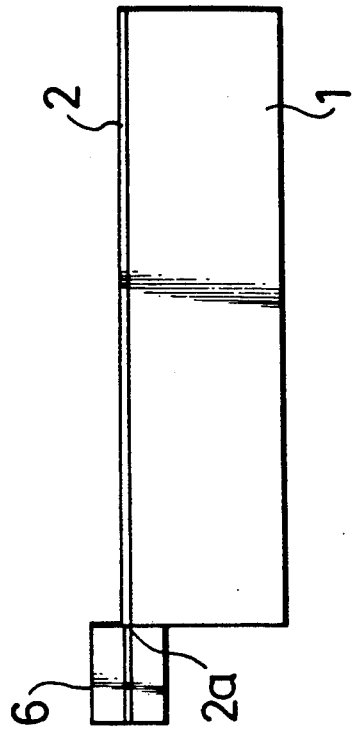
FIG. 8 is an enlarged side view of FIG. 7.

A ridge-type three-dimensional optical waveguide 2 was formed on a substrate 1 made of LiNbO$_3$ non-linear single crystal Y plate or X plate as shown in FIGS. 7 and 8. FIG. 7 is an enlarged planar view of the optical waveguide and second harmonic generator according to the present invention, and FIG. 8 is a side view of FIG. 7.

In this example, the optical waveguide 2 was made of the amorphous film in which TiO$_2$ is doped to Ta$_2$O$_5$. The direction perpendicular to the longitudinal direction of the optical waveguide 2 was selected to be z-axis (c-axis) of the substrate 1, and the input end face side of the optical waveguide 2 for the fundamental wave was tapered to be gradually wide toward its end portion 2a. A semiconductor laser 6 was optically coupled to the end portion 2a of the optical waveguide 2.

As described above, the X plate or Y plate perpendicular to z-axis (c-axis) of the LN substrate is employed to effect the TE wave mode, whereby the semiconductor laser can be connected to the optical waveguide as the fundamental wave light source. Thus, the ½ wavelength plate, required by the TM wave mode, is not needed.

EXAMPLE 6

An example 6 of the present invention will hereinafter be described with reference to FIG. 11. In the example 6, the fundamental waveguide was formed as the ridge-type.

As shown in FIG. 11, an LiNbO$_3$ non-linear single crystal substrate 11 was prepared, and a periodically-poled region 10 was formed on the surface of the substrate 11. Arrows a and b in FIG. 11 schematically illustrate directions of periodically-poled regions, respectively. The periodically-poled region 10 was formed as follows. Ti-deposited films of striped-shape were deposited on one major surface of, for example, the substrate 11 with predetermined width and pitch in parallel to one another, and were heat-treated at a temperature of 1000° C. to 1100° C., for example, 1050° C. for several hours, thus the periodically-poled region 10 being made.

Then, on the surface of the LiNbO$_3$ substrate 11 with the periodically-poled region 10 formed thereon, there was formed the fundamental waveguide 12 which was manufactured in a three-dimensional manner so as to have a width W of about less than 2 micrometers and a length l of about less than 6 mm. The reason that the width W of the fundamental waveguide 12 is selected to be less than 2 micrometers is that this width causes the second harmonic generator to generate an SHG radiation of single mode with ease. Whereas, the reason that the length l is selected to be less than 6 mm is that this length can make the second harmonic generator as small as possible. Then, the fundamental waveguide 12 was formed similarly to the example 1.

The fundamental wavelength was selected to be 0.84 micrometer and a refractive index difference $\Delta n^f$ between the refractive indices of the fundamental waveguide 12 and the LiNbO$_3$ substrate 1 for the fundamental wave was selected to be 0.15 by selecting the TiO$_2$-doped amount of the fundamental waveguide 12. Then, a similar refractive index difference $\Delta n^{SHG}$ for the wavelength 0.42 micrometer of the secondary harmonic wave generation light was selected to be 0.22. When a relationship between the thickness h of the fundamental waveguide 12 and the periodically-poled region cycle $\Lambda$ (micrometer) for providing an SHG light beam of higher than 10 mW relative to the semiconductor laser light of 100 mW (fundamental wave input) was measured, such relationshiop fell in a hatched range encircled by a solid line 51 in FIG. 13. FIG. 14 illustrates an overlap between the fundamental guide mode and the second harmonic radiation mode according to the present invention under a condition of one point within the range encircled by the solid line 51 in FIG. 13, i.e. under the condition that the thickness h is 0.3 micrometer and the periodically-poled region cycle $\Lambda$ is 3.27 micrometers.

COMPARATIVE EXAMPLE 1

Figure 15:
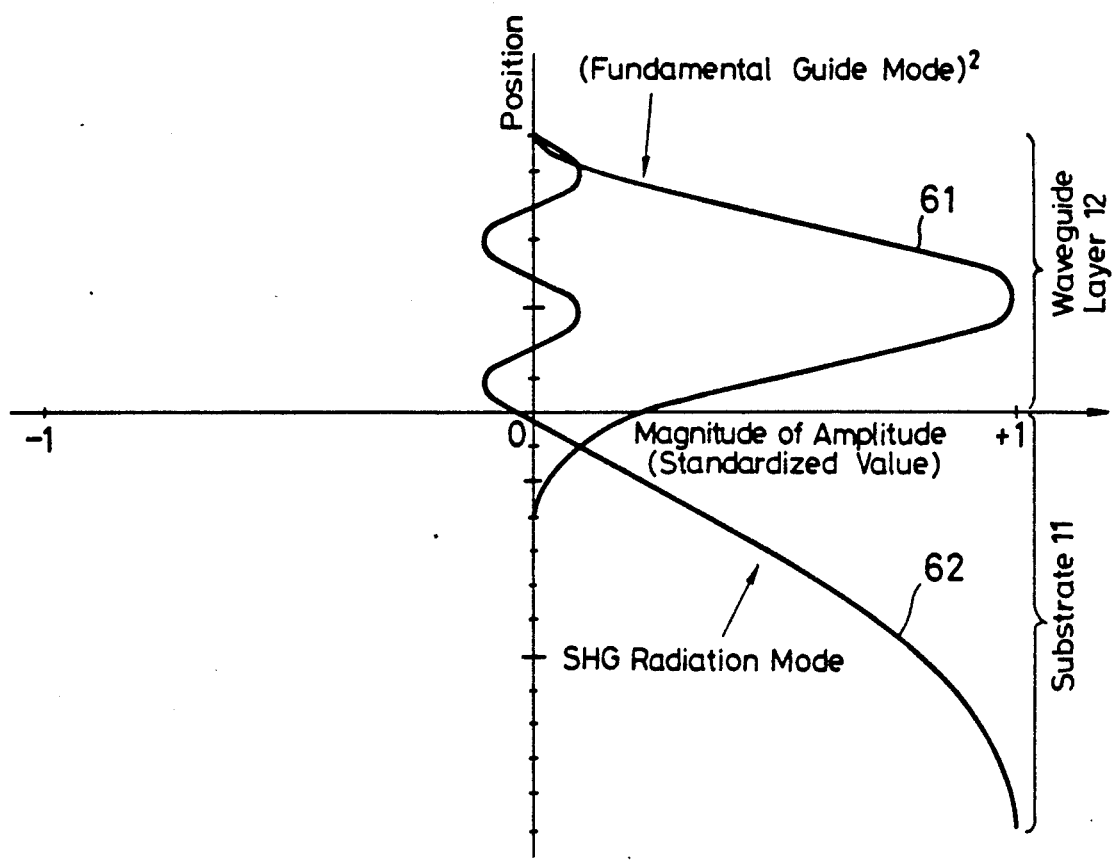

The second harmonic generator was formed similarly to the example 6 and the thickness h was selected to be 0.80 micrometer and the periodically-poled region cycle $\Lambda$ was selected to be 15 micrometers. FIG. 15 shows an overlap between the fundamental guide mode and the second harmonic radiation mode in the case of the comparative example 1.

In the above-noted example, the refractive index n of the cladding layer formed on the surface of the fundamental waveguide 12 is selected to be 1.0 (air). When the cladding layer satisfies, for example, $n^f = 1.9$ and $n^{SHG} = 2.2$, a range of the thickness h and the periodically-poled region cycle $\Lambda$ (this range will hereinafter be referred to as h-$\Lambda$ range, for simplicity) for presenting the SHG efficiency of more than 10% in the example 6 falls in a range encircled by a solid line 57 in FIG. 13. In the above-mentioned example, when the wavelength of the semiconductor laser of 0.8 micrometer band, i.e. the wavelength of the fundamental wave is 0.84 micrometer, the h-$\Lambda$ range in which the SHG efficiency becomes more than 10% lies in a region I encircled by a solid line 21 in FIG. 10. When the wavelength of the semiconductor laser of 0.8 micrometer band is longer than the former, for example, 0.88 micrometer, the h-$\Lambda$ range line in a region II encircled by a solid line 22 in FIG. 10. When the wavelength of the semiconductor laser of 0.8 micrometer band is 0.78 micrometer, the h-$\Lambda$ range lies in a region III encircled by a solid line 23 in FIG. 10. However, if the relationship between the thickness h (micrometer) and the periodically-poled region cycle $\Lambda$ (micrometer) is selected so as to fall within a range encircled by the points a to d in FIG. 10, it will be possible to provide the SHG efficiency of at least more than 10% by selecting the cladding layer and other various conditions. In that event, the Cerenkov radiation angle was less than 5 degrees.

In the following examples 7 to 11, $\Delta n^f$ (wavelength of fundamental wave was 0.84 micrometer) and $\Delta n^{SHG}$ (wavelength of SHG wave was 0.42 micrometer) were changed by changing the TiO$_2$-doped amount in the TiO$_2$-doped-Ta$_2$O$_5$ thin film waveguide 12 shown in FIG. 11.

EXAMPLE 7

A second harmonic generator was formed similarly to the example 6, and $\Delta n^f$ was selected to be 0.10, and $\Delta n^{SHG}$ was selected to be 0.15.

EXAMPLE 8

A second harmonic generator was formed similarly to the example 6, and $\Delta n^f$ was selected to be 0.075, and $\Delta n^{SHG}$ was selected to be 0.13.

EXAMPLE 9

A second harmonic generator was formed similarly to the example 6, and $\Delta n^f$ was selected to be 0.06 and $\Delta n^{SHG}$ was selected to be 0.11.

EXAMPLE 10

A second harmonic generator was formed similarly to the example 6, and $\Delta n^f$ was selected to be 0.04 and $\Delta n^{SHG}$ was selected to be 0.09.

EXAMPLE 11

A second harmonic generator was formed similarly to the example 6, and $\Delta n^f$ was selected to be 0.20 and $\Delta n^{SHG}$ was selected to be 0.30.

Figure 13:
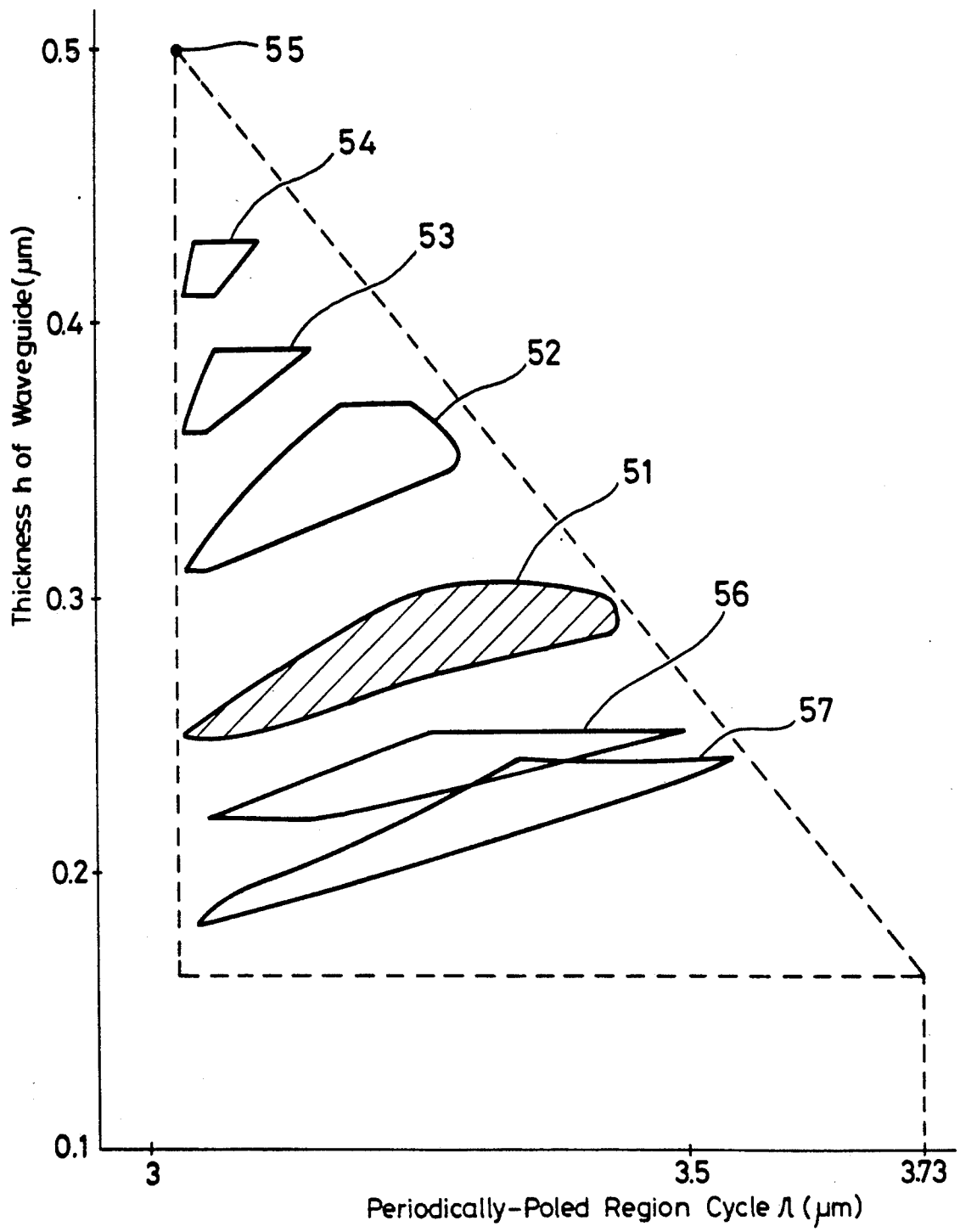
FIG. 13 is a schematic representation to which reference will be made in explaining a range in which a thickness of an optical waveguide and a periodically-poled region cycle are measured.
Figure 14:
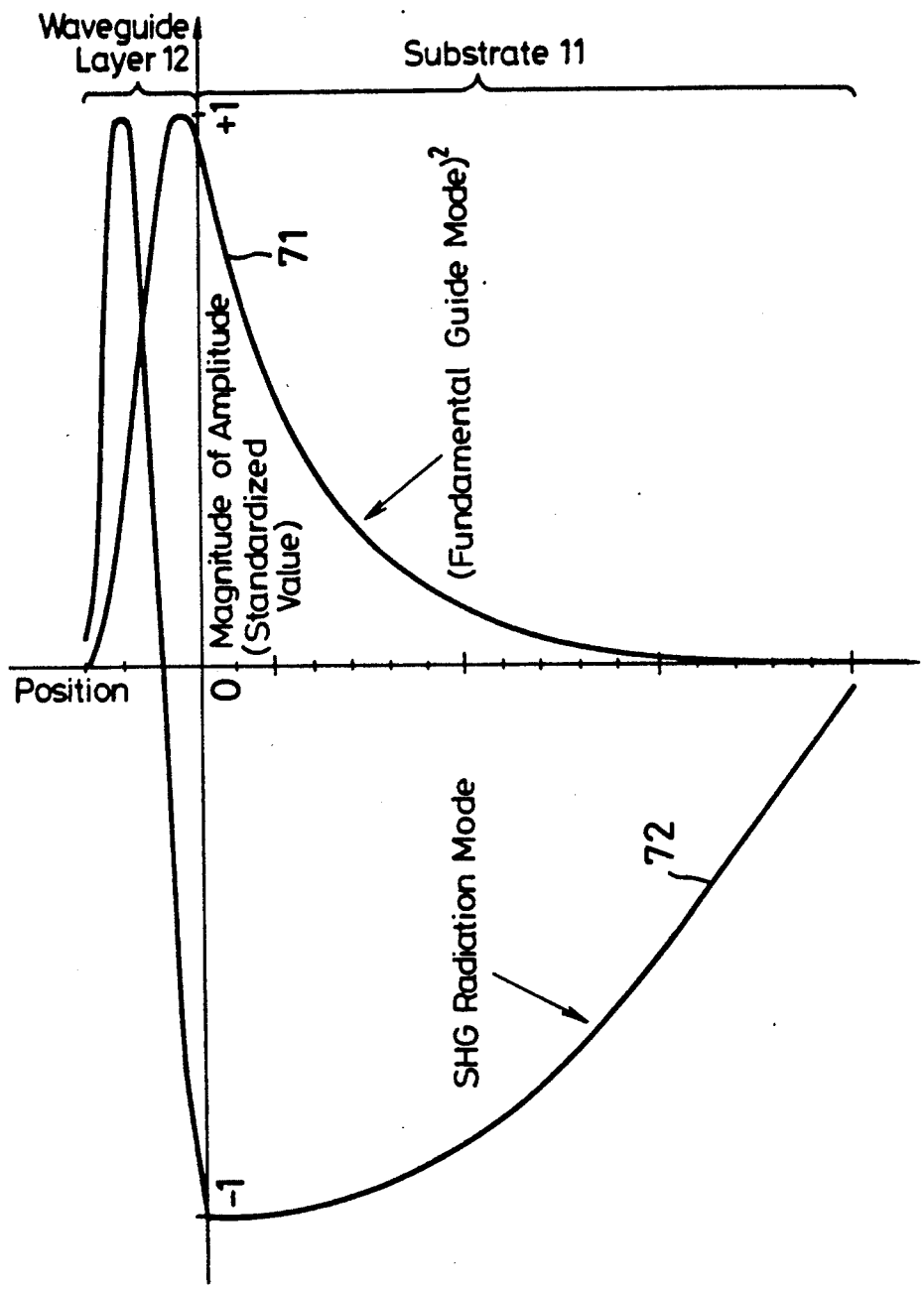
FIGS. 14 and 15 are graphs graphing an overlap between the fundamental guide mode and the second harmonic radiation mode, respectively.

In the above-mentioned examples 7 to 11, the range of the thickness h (micrometer) of the fundamental waveguide 12 and the periodically-poled region cycle $\Lambda$ (micrometer) was selected so as to fall within the ranges encircled by the solid lines 52 to 56 in FIG. 13. In that event, the SHG efficiency of more than 10% could be obtained.

In FIGS. 14 and 15, curves 61 and 71 represent an overlap in the fundamental guide mode, and curves 62 and 72 represent an overlap in the second harmonic radiation mode, respectively. In FIGS. 14 and 15, the ordinate represents the position of the SHG element 13 in the thickness direction, and a point zero indicates an interface between the fundamental waveguide 12 and the substrate 11. One scale corresponds to the thickness of 0.1 micrometer. In FIGS. 14 and 15, the abscissa represents the magnitude of the amplitude of the electric field. In the fundamental guide mode, the square of the amplitude peak is standardized as "1", and in the second harmonic radiation mode, the amplitude peak is standardized as "1".

As is clear from FIG. 14, in the second harmonic generator element according to the example 6 of the present invention, the square of the amplitude of the fundamental guide mode and the amplitude of the second harmonic radiation mode sufficiently overlap each other near the interface between the substrate 11 and the waveguide 12. In other words, the mutual action is very large so that high SHG efficiency can be obtained. In this case, the SHG efficiency reaches about 30%, and accordingly, the length of the mutual action, i.e. the length l of the fundamental waveguide 12 can be reduced and made less than 6 mm as described above. In that event, the Cerenkov radiation angle is about 1 degrees.

In the case of the comparative example 1, the Cerenkov radiation angle is about 2 degrees. However, as is obvious from FIG. 15, the above-mentioned overlap is not produced near the interface between the substrate 11 and the fundamental waveguide 12, and therefore, the SHG efficiency thereof is as small as about $10^{-3}$%.

Having described preferred embodiments of the invention in detail with reference to the accompanying drawings, it is to be understood that the present invention is not limited to those precise embodiments and that many changes and modifications could be effected by one skilled in the art without departing from the spirit and scope of the invention as defined in the appended claims.

We claim as our invention:

1. An optical waveguide comprising:
   a substrate; and
   an optical waveguide formed on said substrate, wherein said optical waveguide is a $Ta_2O_5$-$TiO_2$-system amorphous thin film in which an amount of Ti relative to a sum of Ti and Ta is selected in a range from more than 0 to not more than 60 atomic percent.

2. A second harmonic generator using an optical waveguide according to claim 1, wherein said substrate is a non-linear optical material.

3. A second harmonic generator according to claim 2, wherein said non-linear optical material substrate is a non-linear optical single crystal Y plate or X plate, said optical waveguide has one wide end face which is optically coupled to a semiconductor laser, and said optical waveguide is tapered to be gradually narrow from said one wide end face to another end face thereof.

4. A second harmonic generator according to claim 2, wherein said non-linear optical material substrate is an $LiNbO_3$ substrate.

5. A second harmonic generator according to claim 2, wherein said non-linear optical material substrate has formed on one surface thereof a periodically-poled region.

6. A second harmonic generator according to claim 5, wherein a relationship between the periodically-poled region cycle $\Lambda$ of the periodically-poled region and the thickness h of the fundamental waveguide is arranged to fall within a range which is formed by sequentially connecting by a straight line points (2.38, 0.5), (3.5, 0.5), (4.46, 0.16), (2.38, 0.16) and (2.38, 0.5) in (x, y) coordinates in the orthogonal coordinate system in which the periodically-poled region cycle $\Lambda$ (micrometer) is presented on the x-axis and the thickness h (micrometer) is presented on the y-axis.

7. A second harmonic generator according to claim 6, wherein said substrate is an $LiNbO_3$ substrate.

* * * * *